Aug. 28, 1934.  H. J. WEISSER  1,971,361
THEFT DETECTOR
Filed May 19, 1933
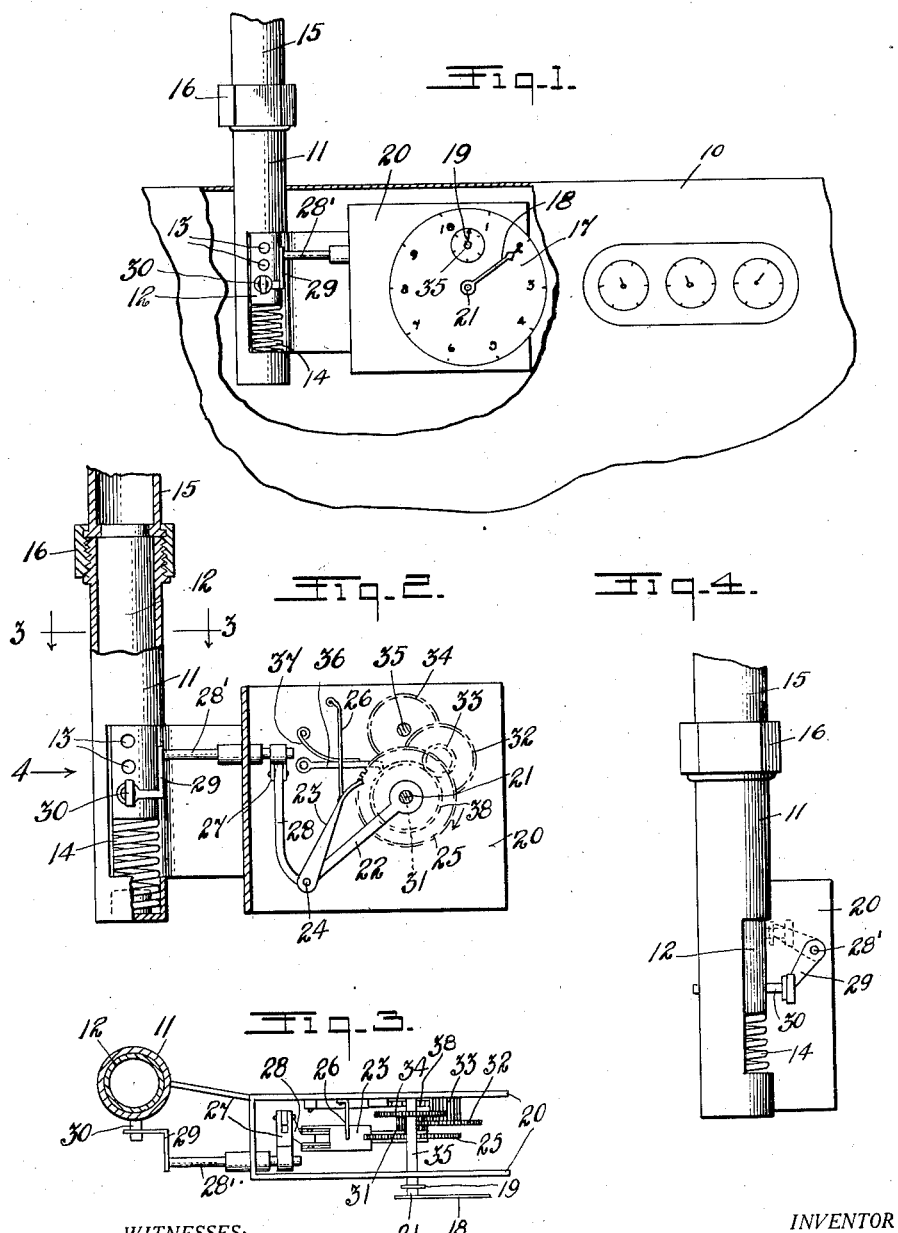
WITNESSES:
INVENTOR
Henry J. Weisser
BY
Joshua R H Potts
HIS ATTORNEY Patented Aug. 28, 1934

1,971,361

UNITED STATES PATENT OFFICE 1,971,361

THEFT DETECTOR

Henry J. Weisser, Pottstown, Pa.

Application May 19, 1933, Serial No. 671,849

7 Claims. (Cl. 116—75)

This invention relates to theft detectors and has for an object to provide improved means for association with a meter to determine when the meter has been tampered with for the purpose of theft of fluid.

A further object of the invention is to provide, in combination with a meter of substantially the usual and ordinary type, having an inlet nipple, means associated with the nipple actuated by the connection of a pipe thereto and by a spring when the pipe is removed, indicating upon a chart any such movement.

A further object of the invention is to provide, in combination with a meter having an inlet nipple, a plunger located in the nipple and normally held yieldingly beyond the end of the nipple by a depressible spring yielding to the coupling of a pipe to said nipple, said spring actuating means for operating an indicator for denoting the uncoupling of the pipe from the nipple.

The invention, therefore, comprises an indicator which is associated with a fluid meter, with a plunger located in the inlet nipple of the meter and depressed when the nipple is coupled with a pipe, and a spring providing means for returning the plunger to normal, when released, and on such action to actuate the indicator.

The drawing illustrates an embodiment of the invention and the views therein are as follows:

Figure 1 is a view of a fragment of a conventional meter with the theft detector associated therewith, part of the meter being broken out for the purpose of exhibiting the detector, Figure 2 is a view of the detector mechanism removed from the meter with the register face and front wall removed to disclose the operating structure, Figure 3 is a top plan view of the indicating mechanism, the nipple and plunger being shown in section as on line 3—3 of Figure 2, and Figure 4 is a view of the device in edge elevation as taken on arrow 4 of Figure 2.

Like characters of reference indicate corresponding parts throughout the several views.

The improved theft detector which forms the subject-matter of this application is adapted to be associated with meters employed for metering fluids of any description. In the drawing a conventional gas meter 10 has been shown merely by way of illustration, it being understood that it is no limitation upon the use of the device with meters employed in conjunction with other fluids.

The meter, of whatever type, is provided with an inflow nipple 11 which may be as illustrated in the drawing, or otherwise, as found convenient. Within this nipple a plunger 12 is located having preferably, perforations 13 so that the fluid may flow through said plunger, which is hollow, as shown at Figure 2, and through the perforations 13 into the meter.

A spring 14 is located beneath the plunger 12, tending to raise the plunger when the pipe 15 is disconnected therefrom by the manipulation of the union 16.

Located within the meter is an indicator having a visible indicating part, conventionally shown as a dial 17, with a pointer 18. A second minor pointer 19 is also provided.

Within the housing 20, which is permanently fixed, a shaft 21 is journaled, to which said shaft the pointer 18 is attached. Operating also upon the shaft 21 is a lever 22 with a pawl 23 connected with the lever at the pivot 24, and engaging the gear wheel 25 carried upon the shaft 21.

To hold the pawl in such engagement, a spring 26 is employed. A link 28 connects the pivot 24 with a crank arm 27 rigidly affixed to a shaft 28' which extends without the housing 20. The shaft 28' is provided with a crank 29 engaging a pin 30 carried by the plunger 12.

When, therefore, the plunger is raised by the action of the spring 14 resulting upon the disconnection of the pipe 15 and the release of the plunger 12, the connection just above referred to will operate the pawl 23 to move the gear 25 in the direction indicated by the arrow.

The shaft 21 also carries a lantern 31 which engages a gear 32 which in turn carries a lantern 33 in engagement with a gear 34 upon a shaft 35 which carries the pointer 19.

When the shaft 21 is rotated, therefore, motion is transmitted to the shaft 35 to move the pointer 19. As the intergearing of the pointers 18 and 19 are out of step, the two pointers will indicate the initial co-relation only at widely spaced intervals. This is to prevent reciprocating the plunger 12 manually to rotate the pointer 18 through an entire circuit to its initial point. If this is done so that the pointer 18 does assume its initial point, the pointer 19 will not be at its initial position. Also, means is provided to prevent reverse movement. A detent 36 with a spring 37 is provided for this purpose, engaging a gear 38 upon the shaft 21.

In operation, the pointers 18 and 19 are set in accordance with a record thereof made. So long as the pipe 15 is not detached from the nipple 11, these pointers will remain as set, as they are in no way connected with the registering mechanism of the meter itself. If, however, the pipe 15 is detached, the spring 14 causes a movement of both the pointers 18 and 19 but not in step.

If the dishonest user attempts to reset the mechanism, he will find it impossible to do so and a mere inspection of the indicator, compared with the record made thereof, will indicate instantly whether or not any attempt has been made to by-pass fluid around the meter.

Of course the theft detector herein illustrated may be modified and changed in various ways without departing from the invention herein set forth and hereinafter claimed.

I claim:—

1. The combination with a fluid meter having an inlet nipple, of a plunger mounted to reciprocate within the nipple, a spring tending to move the plunger longitudinally within the nipple into position to be engaged by a pipe connected to the nipple, and an indicator actuated by the movement of the plunger under the tension of the spring tending to indicate relative to a visible chart.

2. The combination with a fluid meter having an inlet nipple, of a plunger mounted to reciprocate within the nipple, a spring tending to force said plunger beyond the end of the nipple and yielding to the compression of the plunger upon the attachment of a pipe to the nipple, an indicating mechanism having a visible chart, and means actuated by the plunger for indicating relative to the chart any tampering with the nipple.

3. The combination with a fluid meter having an inflow nipple, of a plunger mounted to reciprocate within the nipple, a spring tending to force the plunger beyond the end of the nipple and yielding to the connection of the pipe thereto, a dial, a pointer mounted to rotate relative to the dial, and means to translate reciprocating movement of the plunger into rotary movement of the pointer.

4. The combination with a fluid meter having an inflow nipple, of a plunger mounted to reciprocate within the nipple, a spring tending to force the plunger beyond the end of the nipple and yielding to the compression of the plunger within the nipple, a dial mounted upon the meter, a pointer associated with the dial, a train of gears controlling the pointer, and means connecting the train of gears with the plunger adapted to translate reciprocating motion of the plunger into rotary action of the train of gears.

5. The combination with a fluid meter having an inflow nipple, of a plunger mounted to reciprocate within the nipple, a spring tending to move the plunger, said plunger being adapted to be moved to compress the spring upon the connection of a pipe to the nipple, a dial, a pair of pointers associated with the dial, a train of gears connected with the pointers, and means connecting the train of gears with the plunger to translate reciprocating motion of the plunger into rotary action of the train of gears.

6. The combination with a fluid meter having means for conduit connection, of an indicator, and means to actuate the indicator responding to the breaking of said connection.

7. The combination with a fluid meter having an inlet port, of a member movable in said port, means whereby connection of a supply conduit to said port will move the member to a predetermined position, means tending to move the member away from said position, and means for indicating each operation of the second mentioned means.

HENRY J. WEISSER.